US011653678B2

(12) United States Patent
Laza-Knoerr et al.

(10) Patent No.: US 11,653,678 B2
(45) Date of Patent: May 23, 2023

(54) UREA SUPPLEMENT FOR ANIMAL NUTRITION

(71) Applicant: AGRO INNOVATION INTERNATIONAL, Saint-Malo (FR)

(72) Inventors: Anca L. Laza-Knoerr, Saint-Malo (FR); Philippe Dumargue, Ploufragan (FR)

(73) Assignee: AGRO INNOVATION INTERNATIONAL, Saint-Malo (FR)

( * ) Notice: Subject to any disclaimer, the term of this patent is extended or adjusted under 35 U.S.C. 154(b) by 307 days.

(21) Appl. No.: 16/772,689

(22) PCT Filed: Dec. 14, 2018

(86) PCT No.: PCT/FR2018/053304
§ 371 (c)(1),
(2) Date: Jun. 12, 2020

(87) PCT Pub. No.: WO2019/115978
PCT Pub. Date: Jun. 20, 2019

(65) Prior Publication Data
US 2020/0296999 A1 Sep. 24, 2020

(30) Foreign Application Priority Data
Dec. 14, 2017 (FR) ........................................ 1762183

(51) Int. Cl.
*A23K 50/15* (2016.01)
*A23K 10/16* (2016.01)
(Continued)

(52) U.S. Cl.
CPC .............. *A23K 50/15* (2016.05); *A23K 10/16* (2016.05); *A23K 10/38* (2016.05); *A23K 20/147* (2016.05);
(Continued)

(58) Field of Classification Search
CPC ........ A23K 50/15; A23K 50/10; A23K 20/20; A23K 10/16; A23K 10/38; A23K 20/147;
(Continued)

(56) References Cited

U.S. PATENT DOCUMENTS 5,079,201 A   1/1992   Chu et al.

FOREIGN PATENT DOCUMENTS

| CN | 1802995 | 7/2006 |
|---|---|---|
| CN | 105475644 | 4/2016 |

(Continued)

OTHER PUBLICATIONS

International Search Report and Written Opinion issued for International Patent Application No. PCT/FR2018/053304, dated Mar. 28, 2019, 11 pages including English translation of Search Report.
(Continued)

*Primary Examiner* — Trevor Love
(74) *Attorney, Agent, or Firm* — Hamre, Schumann, Mueller & Larson, P.C.

(57) ABSTRACT

The present invention relates to a mineral dietary supplement for ruminants comprising an organic-inorganic complex based on urea, and various clays for improving the animal's performance by the effect of delaying the release of urea in the rumen. The clays comprise at least one fibrous clay and a nonfibrous clay, preferably attapulgite and montmorillonite.

16 Claims, 11 Drawing Sheets

Scale 600 nm

(51) Int. Cl.
*A23K 10/38* (2016.01)
*A23K 20/147* (2016.01)
*A23K 20/163* (2016.01)
*A23K 20/158* (2016.01)
*A23K 20/189* (2016.01)
*A23K 20/28* (2016.01)
*A23K 20/10* (2016.01)
*A23K 20/20* (2016.01)

(52) U.S. Cl.
CPC .......... *A23K 20/158* (2016.05); *A23K 20/163* (2016.05); *A23K 20/189* (2016.05); *A23K 20/28* (2016.05)

(58) Field of Classification Search
CPC .. A23K 20/158; A23K 20/163; A23K 20/189; A23K 20/28
See application file for complete search history.

(56) References Cited

FOREIGN PATENT DOCUMENTS

| GB | 1533828 | | 11/1978 | | |
|---|---|---|---|---|---|
| WO | WO 2015065951 | * | 5/2015 | ............... | C12N 9/78 |

OTHER PUBLICATIONS

Thomson Scientific, London, GB, vol. 2016, No. 53, 2016, AN 2016-244715, abstract No. 0, Retrieved from: Database WPI [online] XP002784694 (2 pages).

* cited by examiner

Scale 600 nm ium of a farm animal, characterized
UREA SUPPLEMENT FOR ANIMAL NUTRITION The present invention relates to an organic-inorganic complex as well as a dietary supplement for ruminants based on urea and clays for improving the animal's performance, such as daily weight gain or milk production. This dietary supplement may optionally contain zeolite.

PRIOR ART

Dietary nitrogen is partly in protein form and partly in nonprotein form. This last-mentioned fraction consists essentially of amino acids and free amides.

Urea supplementation is current practice for ruminants whose ration is rich in cereals. Urea is transformed by the bacteria present in the rumen, which convert it to proteins, which are then digested by the animal and used as a source of amino acids.

Various inorganic compounds have been combined with urea or with other nitrogen-containing correctants for modifying its properties or its effects. This is the case notably with zeolites and clays. These inorganic compounds may for example slow the release of urea in the body, absorb the ammonia produced in excessive amounts in a diet with a high level of soluble nitrogen, or serve as a binder for forming the urea into granules.

In the present invention, it is not a question of administering urea, and then a mixture of minerals with the aim of adsorbing ammonium in the rumen, but of administering a urea previously incorporated in a mineral complex, to ensure gradual release thereof, and thus avoid excessive formation of ammonium in the rumen. By adsorbing urea in mineral structures it is possible to limit or even prevent the production of ammonium, by acting upstream of this phenomenon.

Finally, the beneficial effects of clays, in particular montmorillonite, on ruminal fermentation, notably on the profile of volatile fatty acids, on the ammonia concentration and on methanogenesis, have been reported in the literature.

Patent GB 1 533 828 describes products for feeding livestock in the form of blocks obtained by mixing, with stirring, molasses and a clay capable of absorbing the water contained in the molasses. The clay may be attapulgite, bentonite or kaolin. Minerals that are sources of calcium or of phosphate, vitamins, fats or urea may then be added to the dispersion obtained.

It was suggested in application CN 105475644 to supplement a lactating ewe with a feed comprising essentially vegetable raw materials, 1-3% of urea, and 3-4% of a composite additive. The feed is obtained by preparing an aqueous suspension notably comprising sunflower seed cake, Dragon fruit flower and Xueqiguo, prawn powder, a rice extract and urea in aqueous suspension. The composite additive is then added to this suspension. The composite additive, in the form of granules, comprises attapulgite, bentonite, and about ten other ingredients of vegetable origin. In this additive, attapulgite ground and sieved at 120-150 microns undergoes an acid treatment before being added to a liquor comprising water, an enzymatic soybean hydrolyzate, chopped citronella, powdered leaves and a rice extract. Bentonite is added to this suspension, which is dried and mixed with other vegetable materials to obtain the composite additive in the form of powder. In this feed, urea is not adsorbed on the clays. Although attapulgite is used in this composite additive for improving intestinal function, digestibility, immunity, growth, and reduction of stress of the animal, there is still a need for further improvement of fermentation of the ration supplemented with urea given to farm animals, in particular to ruminants.

Now, surprisingly, it has been discovered by the inventors that urea together with a combination of at least one fibrous clay and at least one nonfibrous clay can form a complex that modifies the kinetics of fermentation in the rumen and thus improves the animal's zootechnical performance.

DESCRIPTION OF THE INVENTION

Figure 1:
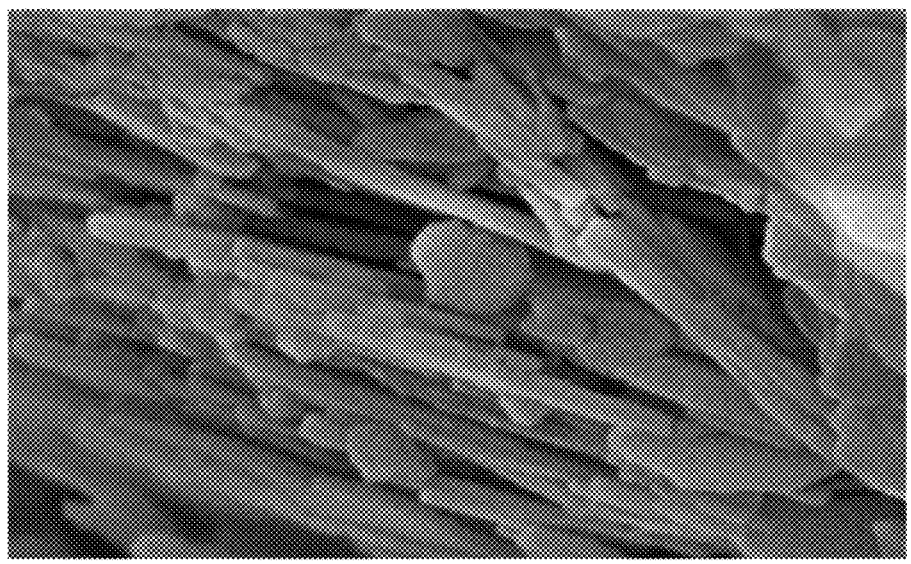
FIG. 1 is a photograph of the complex from Example 1 of the invention observed in SEM.

The invention thus relates to an organic-inorganic complex, consisting of or consisting essentially of urea and mineral particles, for use for increasing at least one zootechnical performance figure of a farm animal, characterized in that said mineral particles comprise at least one fibrous clay and at least one nonfibrous clay, and in that the urea is adsorbed on the clays.

According to one embodiment, the mineral particles consist of at least one fibrous clay and at least one nonfibrous clay.

According to a particular embodiment, preferably the mineral particles comprise a combination of at least one fibrous clay, and of at least one nonfibrous clay including necessarily montmorillonite.

The adsorption of urea at the surface or in the interlayer space of the clays may be observed by any method known by a person skilled in the art, notably by scanning electron microscopy, more precisely by SEM-EDX.

In one embodiment, the organic-inorganic complex consists of or consists essentially of urea and mineral particles comprising at least one attapulgite and a nonfibrous clay, the urea being adsorbed on the surface of the mineral particles, and said surface may be that of their lamellae or those of their pores.

The mineral particles may consist of at least one attapulgite and at least one nonfibrous clay.

Advantageously, the complex increases the zootechnical performance of an animal compared to a simple mixture of urea and mineral powders that are sources of at least one fibrous clay and at least one nonfibrous clay, a mixture in which urea is not adsorbed on the surface of the clays.

Zootechnical performance of the animal in the sense of the invention may consist of a daily weight gain and/or an increase in milk production.

The complex of the invention notably makes it possible to improve an animal's milk production performance. The amount of milk produced may be increased at constant quality. In particular, the butterfat content, the protein content, the somatic cells count and the urea level may be kept constant without adversely affecting the health of the animal's liver.

The farm animal is for example a ruminant.

The inventors have in fact found, surprisingly, that a mixture of a nonfibrous clay and a fibrous clay combined with urea, in the form of a complex administered to a ruminant, makes it possible to improve fermentation in the rumen considerably.

The complex also makes it possible to combat mycotoxins, in particular aflatoxins and fumonisins. Finally, it can increase the daily weight gain of farm animals.

Finally, the complex of the invention and the supplement of the invention offer many advantages relative to the various existing urea substitutes. The complex of the invention makes it possible to achieve zootechnical performance equivalent to that of the prior art using lower doses of urea and of aluminosilicates (clays and/or zeolites).

The mineral powders are preferably natural rocks that have been extracted from the ground, and have optionally undergone transformations such as grinding, sieving, tribomechanical activation or calcination, each of these rocks essentially consisting of a material of interest; such as fibrous clay or nonfibrous clay, the fibrous clay preferably being attapulgite and the nonfibrous clay preferably being a montmorillonite. For example, bentonite is a rock containing predominantly montmorillonite.

According to another preferred embodiment of the present invention, the mineral particles comprise, besides the two clays, at least one zeolite. In this embodiment, the nonfibrous clay may be montmorillonite.

The zeolite, when present, may represent between 0 and 60 wt % of the mineral particles.

In the rest of the description, the word "zeolite" may denote the mineral or the rock containing this mineral, unless stated otherwise. For example, heulandite is a rock comprising predominantly zeolite.

It has been documented that zeolites reduce the amount of ammonium produced in excess in the rumen of ruminants whose ration is supplemented with urea (GB 1 356 313). Zeolites have already been combined with particular clays for which complementarity in the presence of ammonium has been demonstrated. Zeolites are in fact more selective at low concentrations of available cations, and thus bind them more effectively than the clays, whereas the total ammonium absorption capacity of the clays exceeds that of the zeolites and prolongs absorption at higher concentrations. These mechanisms have been demonstrated for varieties of clays such as smectites, kaolinite and attapulgite (U.S. Pat. No. 5,079,201).

The benefits of using a mixture of zeolite, fibrous clay and nonfibrous clay for adsorbing urea are all the more surprising in that, in the prior art, only the combination of zeolite and nonfibrous clay has been described, and in that the benefits of this combination flow from the absorption of the ammonium produced in excess in the rumen, by the mineral particles. The results of the invention are also all the more surprising in that the combinations of urea and zeolite on the one hand and the combinations of urea and bentonite on the other hand have only been used for improving ruminal fermentation.

The mineral particles contained in the complex of the invention preferably comprise more than 40 wt %, preferably more than 50 wt %, or even more than 80 wt % of the mixture of clays, or of the mixture of clays and zeolite when the latter is present, knowing that the mineral particles may comprise water as well as other minerals that are present naturally in the rocks used for making the complex.

In a particular embodiment, the fibrous clay or the mixture of fibrous clays may represent from 10 to 70 wt % of the sum of the weights of all the clays and of the weight of zeolite, when the latter is present; the nonfibrous clay or the mixture of nonfibrous clays may represent from 10 to 60 wt % of the sum of the weights of all the clays and of the weight of zeolite, when the latter is present, the total of the two percentages being greater than 40%.

In one embodiment, the mineral powders are made up of a combination of at least one fibrous clay, at least one nonfibrous clay and at least one zeolite so that the total weight of the mineral particles is equal to the weight of zeolite(s), fibrous clay(s) and nonfibrous clay(s).

In one embodiment in which the complex does not comprise zeolite, the sum of the weights of the fibrous and nonfibrous clays is at least equal to a value selected from the group consisting of 40, 50, 60, 70, 80, 90 and 95 wt % of the total weight of the fibrous and nonfibrous clays. In this embodiment, the fibrous clay is preferably attapulgite and the nonfibrous clay is preferably montmorillonite.

In one embodiment in which the complex comprises zeolite, the sum of the weights of each of the two clays and of the weight of the zeolite is at least equal to a value selected from the group consisting of 50, 60, 70, 80, 90 and 95 wt % of the total weight of the mineral particles. In this embodiment, the fibrous clay is preferably attapulgite and the nonfibrous clay is preferably montmorillonite.

In a preferred embodiment, zeolite (or the transformed rock used as the source of zeolite as stated above) represents between 30 and 60 wt %, preferably between 35 and 55 wt %, more preferably between 45 and 55 wt %, and more preferably between 48 and 52 wt %, relative to the total weight of the mineral particles of zeolite, attapulgite and nonfibrous clay. In another preferred embodiment, zeolite (or the transformed rock used as the source of zeolite as stated above) represents between 0 and 60 wt %, preferably between 0 and 50 wt %, more preferably between 0 and 40 wt %, and more preferably between 0 and 35 wt %, relative to the total weight of mineral particles of fibrous clay, nonfibrous clay and zeolite.

Attapulgite (or the transformed rock used as the source of attapulgite) represents for example between 10 and 50 wt %, preferably between 15 and 45 wt %, more preferably between 20 and 30 wt %, more preferably between 23 and 28 wt %, relative to the total weight of the mineral particles of fibrous clay, nonfibrous clay and zeolite.

The fibrous clay preferably represents between 10 and 65 wt % of the weight of the mineral particles.

The fibrous clay, which is preferably an attapulgite, or the mineral containing it, represents for example between 0 and 70 wt %, preferably between 10 and 65 wt %, more preferably between 20 and 60 wt %, more preferably between 30 and 60 wt %, relative to the total weight of the mineral particles of fibrous clay, nonfibrous clay and zeolite.

The fibrous clay is preferably of natural origin. The clays whose lamellae are discontinuous and form ribbons are regarded as fibrous clays in the sense of the invention. The main types are sepiolite and attapulgite (also called palygorskite).

Its water content, measured by any method known by a person skilled in the art, may be between 10 and 25%. One of these methods consists of measuring the water content by the weight loss in a stove at 105° C. to constant weight.

It may have a granulometry such that the oversize on a sieve of 75 microns by the dry method is less than 20%, preferably less than 15%. Its apparent density may be of the order of 0.3 to 0.6 g/cm$^3$.

The fibrous clay preferably has a specific surface area between 80 and 140 m$^2$/g.

The nonfibrous clay preferably represents from 10 to 60 wt % of the weight of the mineral particles.

The nonfibrous clay, which is preferably montmorillonite, or the mineral containing it, may represent between 10 and 60 wt %, preferably between 20 and 50 wt %, more preferably between 25 and 45 wt %, the percentages being expressed relative to the total weight of the mineral particles of fibrous clay, nonfibrous clay and zeolite.

The nonfibrous clay, which is preferably montmorillonite, or the mineral containing it, may represent between 10 and 35 wt %, preferably between 15 and 30 wt %, more preferably between 22 and 28 wt %, the percentages being expressed relative to the total weight of attapulgite, nonfibrous clay and zeolite.

The nonfibrous clay may be selected from montmorillonite, saponite, vermiculite and kaolinite. A bentonite may be a source of montmorillonite. In one embodiment, the montmorillonite is a bentonite preferably having a water content below 15%, swelling greater than 10 ml/g, a granulometry such that less than 20% of the bentonite particles are larger than 90 microns, and a pH of the order of 9.5.

The nonfibrous clay preferably has a cation exchange capacity (CEC) ranging from 2 to 150 cmol/kg, for example from 30 to 120 cmol/kg, and preferably from 40 to 100 cmol/kg. The cation exchange capacity is defined as the capacity of the clay for exchanging the cations present in the interlayer spaces with other cations or other organic or inorganic molecules.

The nonfibrous clay may advantageously have, besides one of the CEC values stated above, a specific surface area from 10 to 700 m$^2$/g, from 400 to 600 m$^2$/g, or preferably from 450 to 550 m$^2$/g.

The nonfibrous clay, for example such as montmorillonite, may advantageously have a specific surface area from 450 to 550 m$^2$/g, and a CEC from 40 to 100 cmol/kg.

A natural lamellar zeolite, for example of sedimentary origin, is preferred. The zeolite may be derived from a rock, for example such as heulandite, preferably comprising at least 70 wt %, at least 75 wt % or even at least 80 wt % of clinoptilolite.

The rock used as the zeolite source may contain, besides clinoptilolite, a clay, feldspar, mica, cristobalite and illite.

The zeolite may be a zeolite having a crystalline structure of the type ZSM-5, ZSM-11, ZSM-12, ZSM-23, ZSM-35, ZSM-38 or ZSM 48 for example. The diameter of its crystalline structure may be of the order of 0.3-0.5 nm.

The size of the zeolite particles may range from 1 micron to 250 microns; the proportion of particles having a size from 5 microns to 65 microns is preferably between 50 and 75 wt %, and the proportion of particles having a size from 5 microns to 125 microns may range from 75 to 95 wt % or from 85 to 95 wt %. The granulometric distribution of the particles of zeolite may be measured by any method known by a person skilled in the art.

The zeolite may be derived from the chabazites, heulandites, stilbites or natrolites.

The zeolite preferably has a specific surface area between 350 and 400 m$^2$/g.

The zeolite is moreover advantageously characterized by values of zeta potential between −18 and 35 mV depending on the pH. The zeta potential allows estimation of the surface charge, which determines the degree of adsorption of organic molecules. When a zeta potential is measured as a function of pH, there is a pH value for which the zeta potential is cancelled. The potential decreases but does not change sign when the concentration of the adsorbed ion increases.

Its water content, measured by any method known by a person skilled in the art, may be below 8%. One of these methods consists of measuring the weight loss in a stove at 105° C. to constant weight.

Its apparent density may be of the order of 0.6-0.9 g/cm$^3$. It preferably has a capacity for $NH_4^+$ substitution of the order of 20000 mg $NH_4^+$/kg to 27000 mg $NH_4^+$/kg. Finally its cation exchange capacity is preferably above 60 meq/100 g. The specific characteristics of the zeolite described above may correspond either to the zeolite in the organic-inorganic complex comprising urea, or to the state of the zeolite that is used as the starting compound for preparing the organic-inorganic complex.

In one embodiment, i) the weight ratio of urea to the mixture consisting of attapulgite, montmorillonite and zeolite in the organic-inorganic complex of the invention or ii) the weight ratio of urea to the mineral powders, is between 40/60 and 80/20, preferably between 50/50 and 70/30, more preferably of the order of 60/40. The stated percentage of the mineral powders may be the percentage of the powders that are used for making the organic-inorganic complex, or the percentage of the powders that are included in the complex, if the latter can be measured.

The concentration of element N in the mixture of urea and the minerals of the mixture is advantageously between 20% and 45% or between 30% and 40%. The concentration of element N in the mixture of urea and the minerals of the mixture is advantageously between 10% and 40% or between 15% and 35%.

The organic-inorganic complex included in the composition of the invention may be prepared by a method known by a person skilled in the art, using water.

For example, a method using water may comprise four steps: a step of dissolving the urea, a step of suspending at least two clays in the urea solution, a filtration step followed by a drying step. According to one embodiment, the urea is dissolved in water at 65% of urea/35% of water minimum, at a temperature of 55° C.-60° C. with stirring so as to obtain a urea solution containing at least 35 wt % of water. After complete dissolution of the urea, the clays and the zeolite are added and the mixture is stirred for 30 min to 1 hour at a temperature of 40° C.-50° C., before a filtration step and a drying step. Drying may be carried out under air at 40° C.

The powders may be mixed with one another in one or more steps so as to obtain the mixture of powders, which is then put in a reactor, with stirring. The powders may also be fed into the reactor sequentially, optionally preparing premixes of some of these powders.

According to one embodiment, the method for making an organic-inorganic complex of the invention consists of mixing urea and mineral powders comprising a source of fibrous clay, a source of nonfibrous clay and a source of zeolite, the source of zeolite representing from 30 to 60 wt % of the weight of the mineral powders, the source of fibrous clay representing from 10 to 50 wt % of the weight of the mineral powders, the nonfibrous clay representing from 10 to 35 wt % of the weight of the mineral powders, and the weight ratio of urea to the mineral powders being between 40/60 and 80/20.

The complex of the invention may be formed into granules or powder. The granules may be obtained by wet granulation using any binder known by a person skilled in the art.

The invention further relates to a dietary supplement for ruminants or a product for feeding ruminants containing the organic-inorganic complex.

In the dietary supplement, the fibrous clay or the fibrous clays are preferably present at a minimum content of 13 wt %, whereas the nonfibrous clay or the nonfibrous clays are preferably present at a minimum content of 10 wt %.

The supplement may comprise, besides the mixture or the organic-inorganic complex described above, other ingredients selected from the group consisting of vitamins, minerals, byproducts of distillation of cereals with or without solubles (DDG and DDGS), concentrated solubles of cereals (condensed distiller's solubles, CDS), prebiotic fibers, probiotics, amino acids, proteins, omega 3 fatty acids, lignans, digestive enzymes, essential oil of *Thymus vulgaris*, chestnut extracts, leonardite, peat, chestnut tannins, flax seeds, polyphenols, saponins, advantageously the steroid and/or triterpene saponins, microalgae such as *chlorella* or *Spirulina* (important natural nitrogen source in the form of essential amino acids), macroalgae or extracts of algae.

The *Spirulina* preferably contains 65 wt % of proteins, 15 wt % of carbohydrates, 7 wt % of lipids (linoleic acid=8 g/kg; gamma-linolenic acid (GLA)=10 g/kg), 7% of minerals (calcium=10000 mg/kg; chromium=3 mg/kg; copper=12 mg/kg; iron=1800 mg/kg; magnesium=4000 mg/kg; manganese=50 mg/kg; phosphorus=8000 mg/kg; potassium=14000 mg/kg; sodium=9000 mg/kg; zinc=30 mg/kg), 2 wt % of fibers, amino acids (alanine=47 g/kg; arginine=43 g/kg; aspartic acid=61 g/kg; cystine=6 g/kg; glutamic acid=91 g/kg; glycine=32 g/kg; histidine=10 g/kg; isoleucine=35 g/kg; leucine=54 g/kg; lysine=29 g/kg; methionine=14 g/kg; phenylalanine=28 g/kg; proline=27 g/kg; serine=32 g/kg; threonine=32 g/kg; tryptophan=9 g/kg; tyrosine=30 g/kg; valine=40 g/kg), 5 wt % of vitamins and 2 wt % of water.

The dietary supplement may comprise, besides the complex described above, at least one mineral compound selected from the group consisting of $Ca(H_2PO_4)_2$, $CaHPO_4$, terrestrial limestone, marine limestone, $MgO$, $Na_2SO_4$, $NaHSO_4$, $Na_2CO_3$, $NaHCO_3$ and $CaSO_4$.

The dietary supplement may also comprise sugars, fats, waxes or flours.

The dietary supplement may thus be obtained by a method of granulation or compaction of the complex, optionally adding an aqueous solution that may contain molasses, CDS, lignosulfonates or any other binder known by a person skilled in the art.

The dietary supplement according to the invention may be in various forms, notably in powder, granules or blocks. The granules may be obtained by spraying an aqueous solution containing the ingredients and the complex, or alternatively by spraying an aqueous solution containing the ingredients on the complex.

The invention also relates to a composition for feeding ruminants comprising a mixture consisting of or consisting essentially of urea and mineral powders comprising at least one zeolite, at least one attapulgite and at least one nonfibrous clay. This mixture may be in the form of a complex in which urea is adsorbed on the surface of the particles of clays and zeolite.

The invention also relates to a method for feeding ruminants, which consists of supplementing the animal's daily ration with the organic-inorganic complex described above.

The mixture may consist of urea, at least one zeolite, at least one attapulgite and at least one nonfibrous clay.

The invention also relates to a method of feeding a ruminant that consists of giving the animal the organic-inorganic complex or the dietary supplement described above.

The dietary supplement or the complex may be given to the animal independently of the ration or may be incorporated in the ration in the form of granules or powder.

The method of feeding a ruminant may consist of giving a daily ration supplying the animal with 5 to 50 g/day of zeolite, 5 to 30 g/day of attapulgite, from 1 to 20 g/day of montmorillonite and from 50 to 180 g/day of urea. It has in fact been discovered in the context of the invention that the particular combination described above makes it possible to achieve an equivalent quality of fermentation at lower doses of urea, or improve the quality of fermentation at equivalent doses of urea. The quality of fermentation is evaluated by any method known by a person skilled in the art, such as investigating the milk quality or investigating the weight gain.

In a particular embodiment, the complex or the supplement described above is added to the ruminant's daily ration advantageously at a rate from 50 to 250 g of composition/mixture per kilogram of ration.

This ration may for example be made up of fodder of all types and in all forms (green, dehydrated, ensiled, agglomerated), fodder grasses, fodder cereals (barley, maize, oat, wheat, sorghum, soybean, rye), legumes (pea, horse bean, lupine, soybean, alfalfa, sainfoin, clovers), roots, tubers and byproducts thereof (beets, beet pulp, potato, potato pulp), cabbage, colza, sunflower, vegetable waste (tops, stalks, husks of cereals, wheat bran, rye bran, shelled maize cobs, bagasse) and potato starches, food industry byproducts (starch factory, potato starch works, ethanol plant, brewery, flour milling), as well as oilseed cakes (soybean cake), syrups and ammonium salts.

According to one embodiment, the daily ration comprises hay, maize silage, grass silage, cereals, oilseed cakes, and a soluble nitrogen source.

The ruminant may be selected from bovines, sheep and goats. The bovines include in particular the cow, in particular the dairy cow, suckling cow, heifer, calf, grazing animal, bull calf, antelope, ox, fatstock, bull, buffalo, yak, gayal and banteng. Sheep include in particular mouflon, sheep, ewe, two-year-old ewe not yet having borne young, and lamb. Finally, goats include in particular female goat, male goat, kid and ibex.

According to one embodiment, it is a milk-producing animal such as a cow, a ewe or a goat.

The invention is illustrated by the following examples. The physicochemical parameters that are mentioned in the present application may be measured by any method that is known by a person skilled in the art and is suitable for the technical problem solved by the invention.

Examples 1 to 8: Preparation of Complexes of the Invention and of Comparative Complexes a) Firstly, organic-inorganic complexes according to the invention as well as complexes of the prior art were prepared. Their compositions are given in detail in Tables 1, 2 and 3.

TABLE 1

Composition of complexes of the invention

| | Percentages by weight | | |
|---|---|---|---|
| | Example 1 | Example 2 | Example 3 |
| Components | | | |
| Urea | 66% | 50% | 60% |
| Zeolite | 17% | 12.5% | 18% |
| Attapulgite | 8.5% | 6.25% | 14% |
| Montmorillonite | 8.5% | 6.25% | 8% |
| Total | | 100% | |
| Parameters | | | |
| Weight ratio: urea/mineral powders | 2/1 | 1/1 | 1.5/1 |
| Weight ratio: Zeolite/Attapulgite/Montmorillonite | 50/25/25 | 50/25/25 | 45/35/20 |
| Concentration of element N | 36% | 26% | 27% |

TABLE 2

Composition of complexes of the invention

| | Percentages by weight | | | |
|---|---|---|---|---|
| | Example 4 | Example 5 | Example 6 | Example 7 |
| Components | | | | |
| Urea | 60% | 61% | 67% | 63% |
| Zeolite | 20% | 17% | 13% | 0% |
| Attapulgite | 10% | 14% | 13% | 21% |
| Montmorillonite | 10% | 8% | 7% | 16% |
| Total | | 100% | | |
| Parameters | | | | |
| Weight ratio: urea/mineral powders | 1.5/1 | 1.6/1 | 2/1 | 1.7/1 |
| Weight ratio Zeolite/Attapulgite/Montmorillonite | 50/25/25 | 45/35/20 | 40/40/20 | 0/67/33 |
| Concentration of N | 27% | 28% | 31% | 29% |

TABLE 3

Composition of comparative complexes

| | Percentages by weight | | |
|---|---|---|---|
| | Comparative example UZ 21 | Comparative example UA 21 | Comparative example UM 21 |
| Components | | | |
| Urea | 66% | 66% | 66% |
| Zeolite | 33% | | |
| Attapulgite | | 33% | |
| Montmorillonite | | | 33% |
| Total | | 100% | |
| Parameters | | | |
| Weight ratio: urea/mineral powders | 2/1 | 2/1 | 2/1 |
| Concentration of N | 30.5 | 31.4 | 30.1 |

The urea was dissolved in water at a temperature of 55° C.-60° C. with stirring so as to obtain a urea solution containing at least 35 wt % of water. After complete dissolution of the urea, the zeolite (of grade Zeofirst®, company ACTIFEED) and the clays (attapulgite of grade Clarsol® ATC-NA, company CLARIANT, and montmorillonite of grade AGRI® Bond 400, company IMERYS) were added and the mixture obtained was stirred for 30 min to 1 hour at a temperature of 40° C.-50° C. A filtration step and a drying step under air at 40° C. for 24 hours were then carried out.

An organic-inorganic complex was obtained in which the urea is located in the zeolite pores and in the clay lamellae.

It is shown in a photograph of Example 1 taken by scanning electron microscopy (see FIG. 1).

b) Secondly, a supplement according to the invention was prepared in the form of granules with the following composition presented in Table 4.

TABLE 4

Composition of Example 8 of the invention

| Example 8 | wt % |
|---|---|
| Complex from Example 3 | 68-75% |
| DDG or DDGS | 5-20% |
| CDS | 5-20% |
| Mixture of prebiotic fibers, probiotics, amino acids, proteins, omega 3, lignans and digestive enzymes | Balance to 100% |

This product was prepared by wet granulation of the mixture of the various ingredients.

Example 9: Tests of Degradation in Saliva

The kinetics of the concentration of $NH_4^+$ in saliva was studied at 39° C. and pH 6.5 for 24 hours, of examples 1, 2 and 4 to 6 of complexes of the invention.

Their kinetics was compared with that of soybean, prilled urea, and of the product Optigen®16 (supplier Alltech; urea coated with a fat film for protection in the rumen).

1.1 Test Setup

The setup consists of 250-ml bottles containing 200 ml of buffered artificial saliva at pH 6.5. This saliva consists of:
Buffering substances: carbonate of $Na^+$ and of $NH_4^+$
Macro-elements: Na, P, K and Mg
Trace elements: Ca, Mn, Co and Fe 1.2 Treatments Each product is put in a porous paper sachet that allows dissolution of the elements with a granulometry below 500 μm. Four repetitions of each variant are put in the same bottle of artificial saliva. The degradation of the product is monitored over a period of 24 h (30 min, 1 h, 2 h, 4 h, 6 h and 24 h) in a stove with elliptical stirring (set at 39° C. and 40 rpm). Each variant comprises 24 sachets containing 2 g of product.

After measuring the kinetics at each kinetics measurement point, the sachets are recovered and dried in a lyophilizer for 24 h before being analyzed to determine the residual concentration of nitrogen in the product.

1.3 Processing the Results

The results are analyzed with the SAS software according to the GLM model.

1.4 Results

Figure 2:
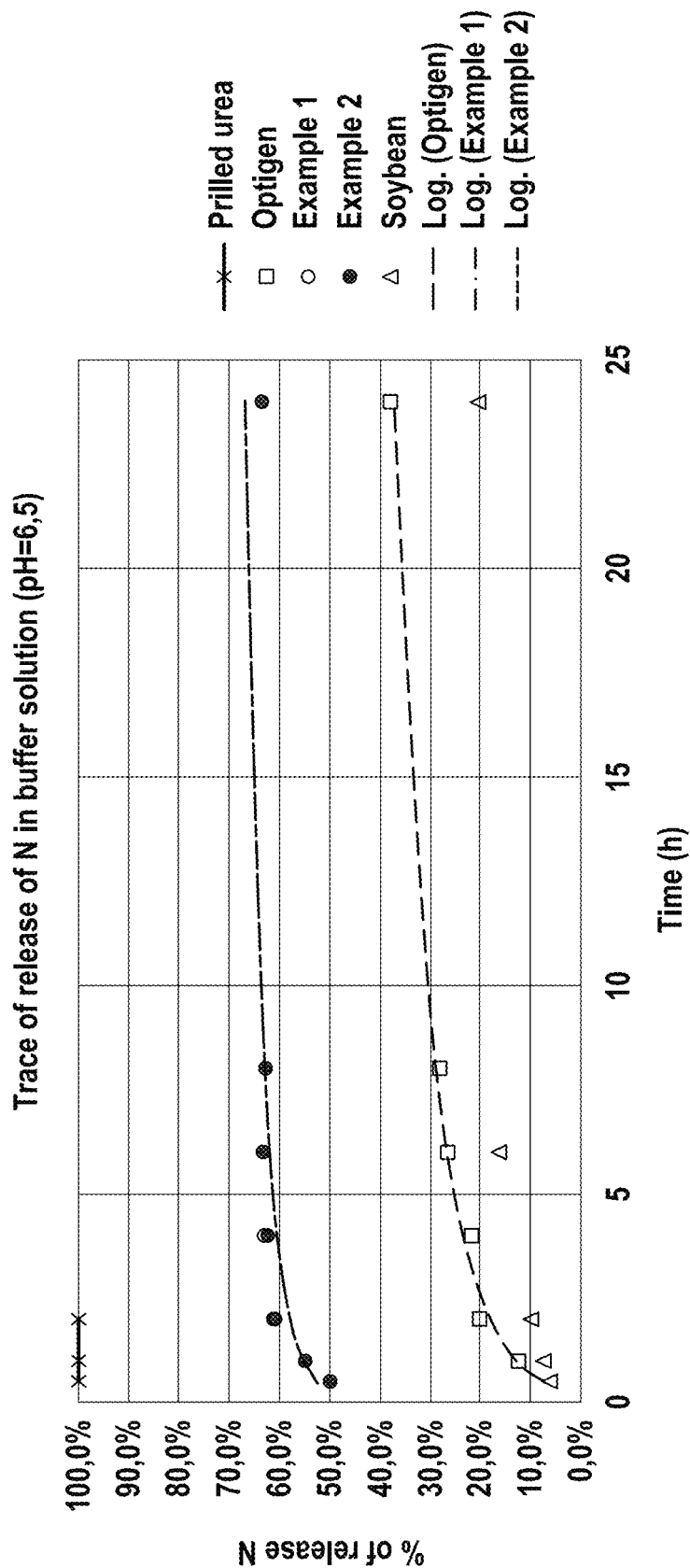
FIG. 2 and FIG. 3 present the profiles of the kinetics of the concentration of $NH_4^+$ in saliva at 39° C. and pH 6.5 for 24 hours in vitro, from examples 1, 2 and 4 to 6 of complexes of the invention, and of the product Optigen®16 of the prior art.
Figure 3:
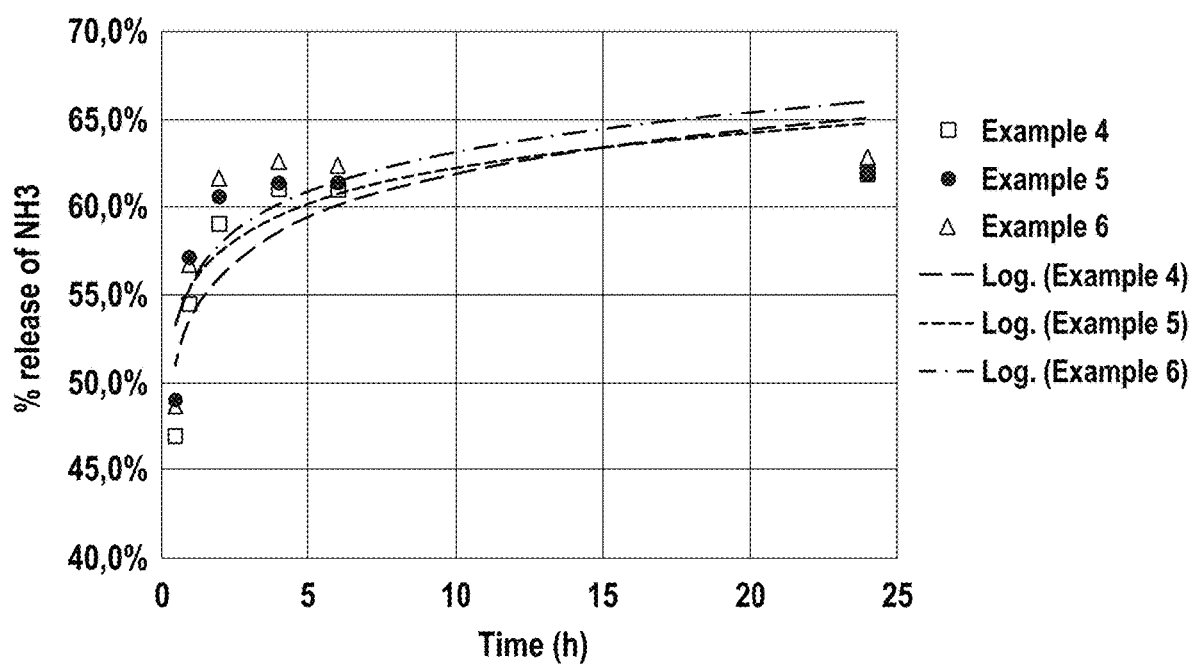

A first series of results is presented in FIGS. 2 and 3.

In FIG. 2, the points of the curve from Example 1 merge with the points of the curve from Example 2.

The following elements may be observed in the two figures:
Total release after 2 h for urea Gradual release up to 60% for Examples 1 and 2
Release below 50% Optigen®16.

A second series of results is presented in FIG. 3.

The following elements may be concluded:

Significant effect of the attapulgite dose (p=0.0232): 40%>25%>35%

Significant effect of the urea dose (p<0.001): 2>1.6>1.5

Taking the results into account, the optimal dose of attapulgite in the invention (favorable concentration of N+protection of this N on release) is 35%.

Incorporation of urea is ideally 60% to offer a product rich in N allowing optimal controlled release.

Example 10: Study of Fermentation in an Artificial Rumen

The effect of the release of $NH_4^+$ on fermentation in the rumen was quantified by measuring the rate of production of gases over a period of 24 hours with examples 1 and 2 of the invention.

They were compared with that of the examples of comparative complexes UA 21, UZ 21 and UM 21, that of soybean, that of prilled urea, and that of the product Optigen®16 (supplier Alltech; urea coated with a fat film for protection in the rumen).

The protocol of the study of fermentation in an artificial rumen that was followed was as follows.

1.1 Test Setup

The setup consists of fifty 100 mL bottles containing 60 mL of an inoculum based on rumen juice and buffered artificial saliva (1:3). This saliva consists of:

Buffering substances: carbonate of $Na^+$ and of $NH_4^+$

Macro-elements: Na, P, K and Mg

Trace elements: Ca, Mn, Co and Fe

Colored indicator

Reducing solution allowing verification of anaerobiosis of the medium to simulate the environment of the rumen This inoculum is incubated in conditions of anaerobiosis at 39° C. with a limiting substrate for N (6 g of straw), to simulate physiological conditions. To compensate the supply of soluble nitrogen and allow the bacteria to use this substrate correctly, a source of quickly available energy must be supplied: maize starch, at a rate of a ratio 1/2 (urea/starch), i.e. 0.2 g/bottle.

1.2 Treatments

Each study consists of two controls, a negative control without nitrogen supplementation and a positive control with urea so as to be able to compare the different test products. A minimum of four repetitions is necessary for statistical analysis of the results.

To determine the rate of fermentation of each variant, the production of gases is monitored in real time using the RF recording system from Ankom.

1.3 Processing the Results

The results are analyzed with the SAS software according to the GLM model.

1.4 Results

Figure 4:
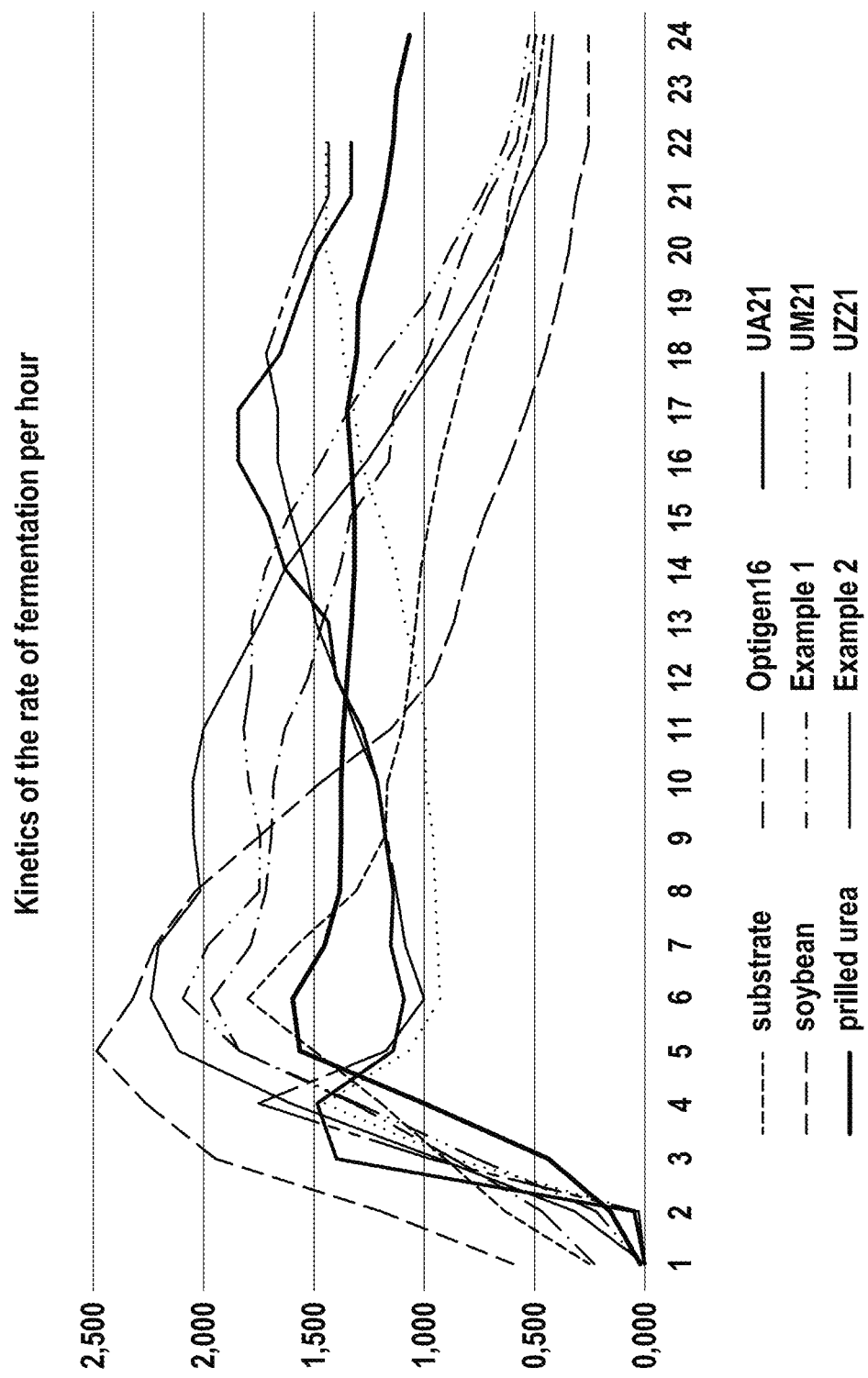
FIG. 4 and FIG. 5 are diagrams showing the kinetics of fermentation of the examples of complexes 1 and 2, of the examples of comparative complexes UA 21, UZ 21 and UM 21, and of the product Optigen®16 of the prior art.
Figure 5:
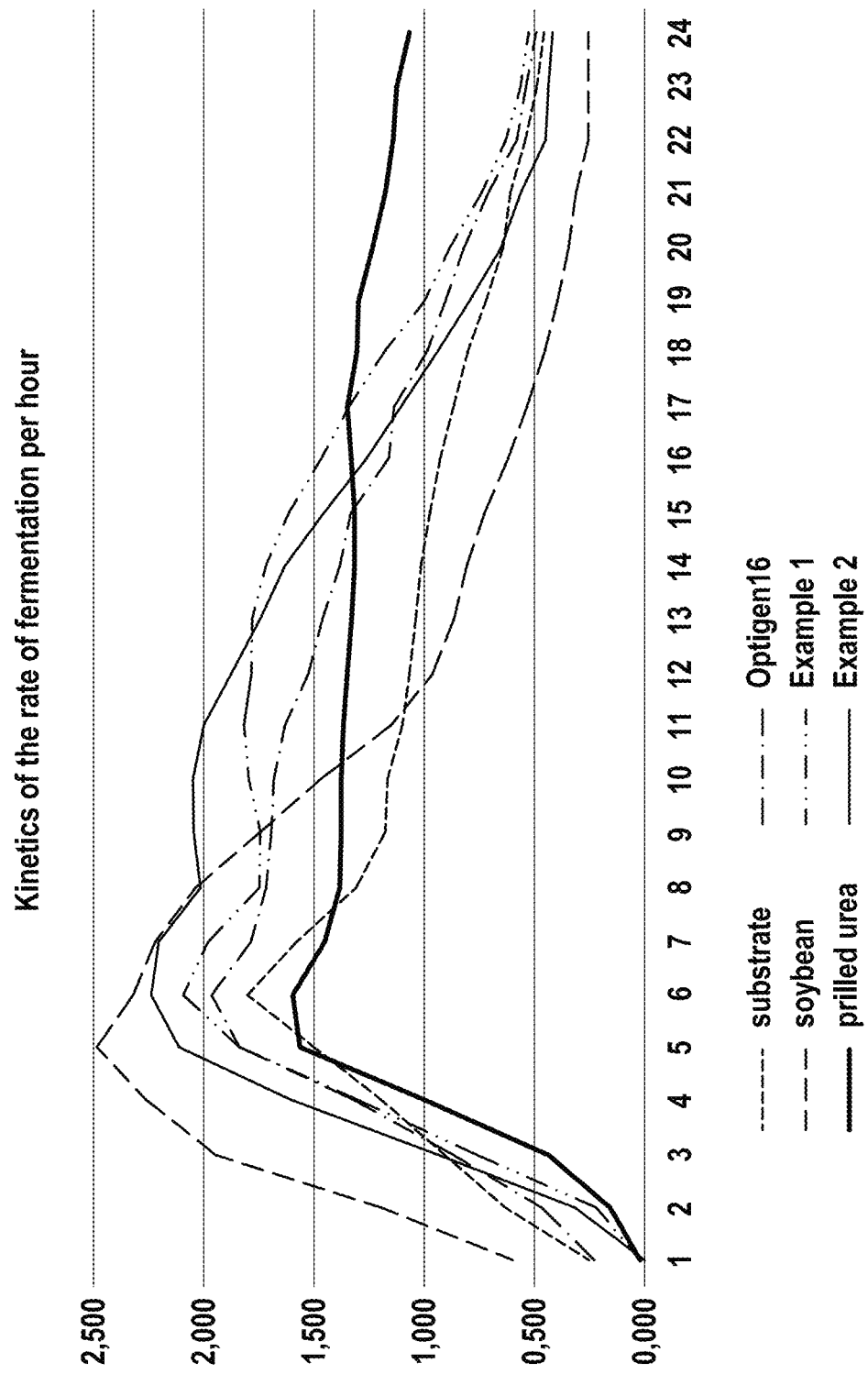

The results are presented in FIGS. 4 and 5. In FIG. 5, the curves from Examples 1 and 2 and the curve of the product Optigen®16 are reproduced for better visualization of the differences.

The curves shown comprise, over a period of 24 hours representative of the animal's biological rhythm, one or two fermentation peaks.

A first peak corresponds to the N utilization of the ration and of the unprotected product, which is therefore immediately available: this first peak is observed in all the variants. It occurs for example at about 6 hours for Examples 1 and 2, and at about 4 hours for UM 21 and UZ 21.

A second peak, when present, corresponds to the utilization of the N of the protected nitrogen, which is released gradually. It may be visualized at about 10 hours for Example 1, at about 13 hours for Example 2, and at about 17 hours for the comparative example UA 21.

The complexes of the invention advantageously comprise two peaks, which makes it possible to prolong the utilization of nitrogen and make it more gradual.

A single peak occurs with the urea since it is not protected: the peak corresponds to immediate release of the N.

For the products comprising protected urea, such as the product Optigen®16 and the comparative complex UM 21, the peak observed corresponds to immediate release of the N. A second peak corresponding to delayed release of the urea ought to be observed, but this is not the case, very probably because it occurs after 24 hours. The urea is too protected and its release is too delayed.

The complexes of the invention therefore have better performance than the products for which a single peak is observed, because all the urea that they contain is released immediately, or because the urea is too protected to be released within a reasonable time.

Examples 1 and 2 of the invention and comparative examples UA 21 and UZ 21 are among the products generating two fermentation peaks within 24 hours.

The first peak of fermentation of the examples of the invention occurs later than that of the comparative examples, so that release of the N available in the first few hours is greater, quantitatively, it takes place over a longer period and it is more gradual (see the slopes of the curves).

Moreover, the second peaks of the examples of the invention occur between about 10 and 13 hours. They are observed much later with the comparative examples (for example after 17 hours or 18 hours).

Now, it is far more beneficial for the animal if fermentation takes place in as regular a manner as possible and over a period of at most 14 hours, so that its chronobiological rhythm is respected.

Thus, the complexes of urea and mineral powders of the invention make it possible to maintain high, smooth fermentation kinetics over a period of the order of 12 to 14 hours. This kinetic profile had never been obtained before. It makes it possible to improve the animal's zootechnical performance.

The rate of fermentation is stabilized over a period of about 8 hours. It gradually increases until complete consumption of the N available, then it is maintained because the protected N takes over. In the prior art, the peaks observed are very narrow and spaced apart, which does not allow high kinetics to be maintained for a period of 6 to 8 hours.

Example 11: Test of Absorption of Mycotoxins by the Complex from Example 2

The absorption of the mycotoxins AFB1, FB1 and FB2 was studied in two conditions of pH (pH=3 and pH=7).

4.1 Protocol

The test product is mixed at a dose of 1 kg/T with a buffered solution (pH 3 and pH 7) contaminated individually with the mycotoxins described in Table 5.

TABLE 5

| Condition of the test of absorption of mycotoxins | |
| --- | --- |
| Mycotoxins | Concentration (ppb) |
| Aflatoxin B1 (AFB1) | 5000 |
| Fumonisin B1 (FB1) | 50 |
| Fumonisin B2 (FB2) | 50 |

The solutions are mixed at 200 rpm for 90 minutes at 37° C. They are then analyzed by LC-MS/MS to determine the remaining concentration of each mycotoxin, which makes it possible to find the amount of toxin fixed by the product.

4.2 Results

The results are summarized in Table 6 below.

TABLE 6

| Absorption of the mycotoxins by the complex of the invention | | |
| --- | --- | --- |
| | Percentage fixation | |
| Mycotoxin | pH 3 | pH 7 |
| AFB1 | 89% | 70% |
| FB1 | 42% | 5% |
| FB2 | 39% | 6% |

4.3 Conclusions

The complex in Example 2 of the invention reduces the impact of the aflatoxin B1 and of the fumonisins (B1 and B2) in the test conditions in vitro.

Example 12: In Vivo Study in a Dairy Cow Farm, of the Effects of the Complex from Example 1

The objective of the study was to test the product in vivo on a batch of cows for 1 month to evaluate the effect on milk production, fat content (BC), protein content (PC) and the urea level in the milk.

1) Materials and Method:

1.1 Animals, Characteristics of the Batches:
- 2 batches of dairy cows (Holstein breed): 9 animals per homogeneous batches (n=20), one animal was removed in the course of the study.
- in stalls, without grazing and identical milking conditions (by robot)
- The parameters at the start of the test are given in Table 7 below.

TABLE 7

| Parameters at the start of the study | | |
| --- | --- | --- |
| Parameters at the start of the test | Test | Control |
| Number of animals | 9 | 9 |
| Average lactation rank (year) | 2.1 | 2.0 |
| Average lactation days (d) | 202 | 186 |
| Average milk production (kg) | 38.6 | 39.1 |
| Butterfat content (g/kg) | 42.5 | 44.0 |
| Protein content (g/kg) | 32.5 | 32.9 |
| Cells (*1000) | 35 | 53 |
| Urea (mg/kg) | 199 | 220 |

1.2 Feeding:

Control: Product of the Prior Art

Basic Ration:

Hay, maize silage, grass silage, triticale (cereal resulting from crossing wheat and rye), mixture of soybean cake (70%) and colza (30%) (product AlimDuo®).

Individual Supplementation by Robot

Nitrogen-containing correctant (AdeliaTanePro® combining soluble nitrogen and soybean cake semi-protected by a tanning process marketed by the company TRISKALIA) and Aliment VL ("Feed DC"), the whole at a rate of 500 g/dairy cow.

Test (Iso Energy and Iso Nitrogen):

Basic Ration:

Identical to that of the Control:

Individual Supplementation by Robot

Identical to that of the Control described above, from which 535 g of the nitrogen-containing correctant of the prior art is removed (i.e. half), 200 g of product from Example 1 in 100 mL of water is added by dosing, and 440 g of triticale is added to the trough in order to make up the energy deficit following withdrawal of the correctant.

Figure 6:
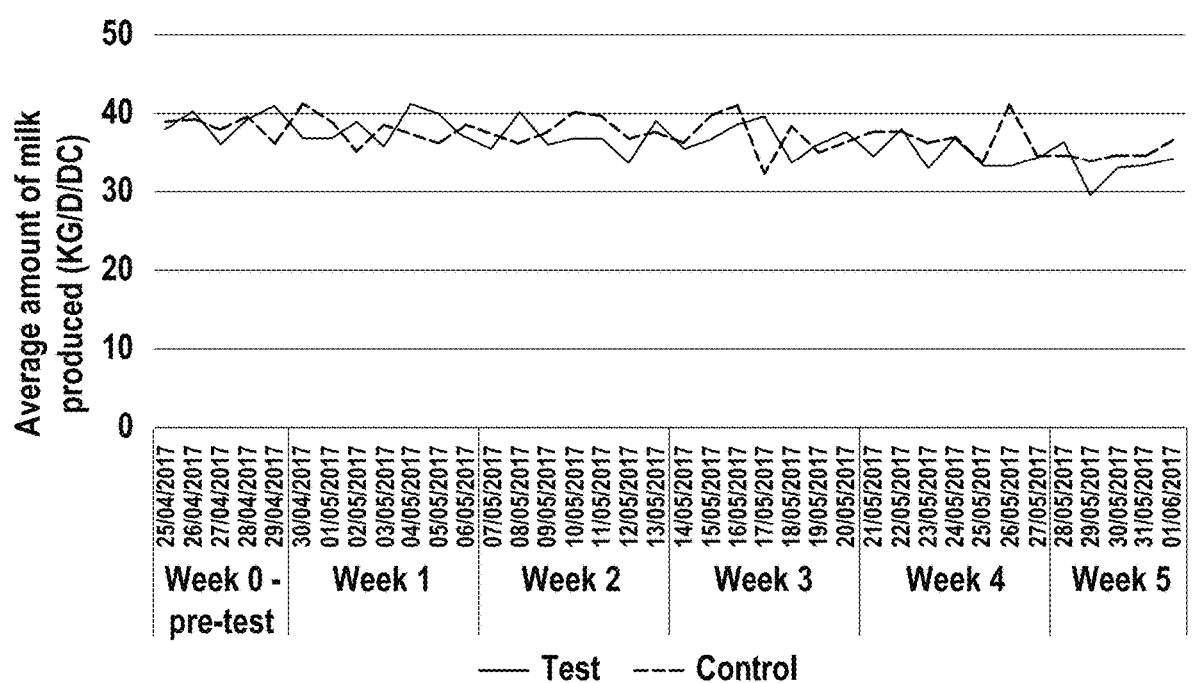
FIG. 6, FIG. 7, FIG. 8, FIG. 9 and FIG. 10 show the variation over time of milk production and of the quality criteria of the milk, namely butterfat content (BC), protein content (PC), somatic cells count and the urea level in a feed where the ration was supplemented with the complex from Example 1.
Figure 7:
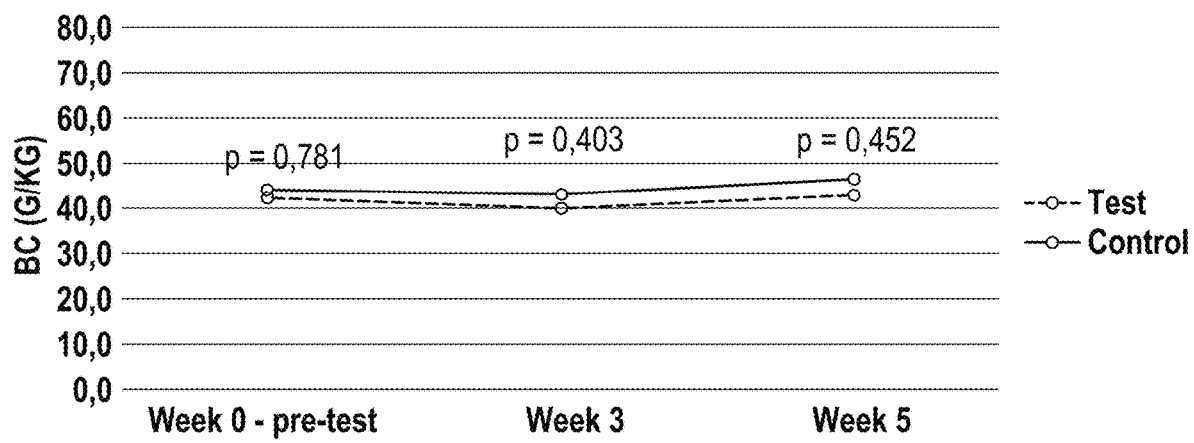
Figure 8:
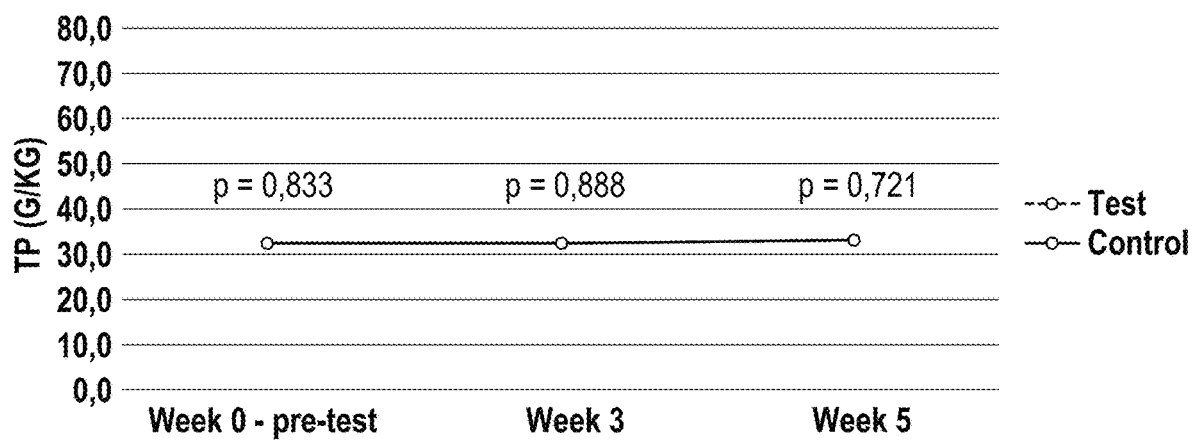
Figure 9:
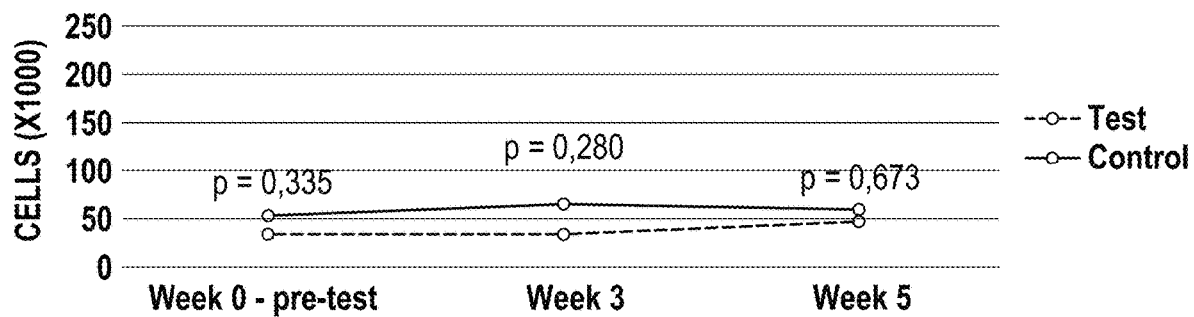
Figure 10:
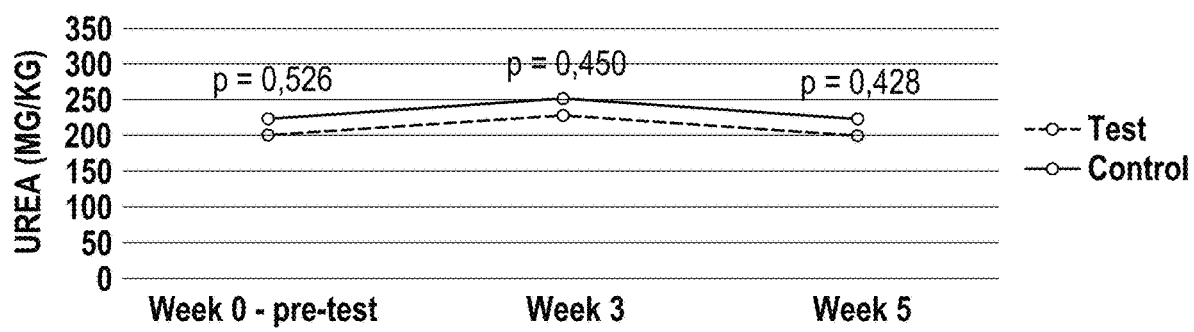

2) Results 2.1) Milk production:

The results obtained are presented in FIG. 6.

2.2) Milk Quality:

The results are presented in FIGS. 7 to 10.

CONCLUSIONS

The complex of the invention offers many advantages relative to the nitrogen-containing correctant of the prior art (identified as control in the figures).

In this test, conducted in France at a dairy cow farm, the results obtained with the supplement of the invention, supplying a delayed-release urea, are very advantageous. At lower doses:

- The iso-N and iso-energy replacement of the nitrogen-containing correctant of the prior art AdeliaTanePro® (535 g) with a mixture made up of the protected urea from Example 1 (200 g) and triticale (400 g), makes it possible to maintain the animal's performance.
- Milk production is identical in the 2 batches (p>0.05).
- Milk quality stays the same in the 2 batches: there is no of loss of content (p>0.05) for the fat content (BC) and the protein content (PC).
- The product from Example 1 does not have a negative impact on the urea level in the milk (p>0.05): the results are similar to those obtained with the product of the prior art.
- There is no effect of the supplementation (p>0.05) on the somatic cells count.

Example 13: In Vivo Study at a Dairy Cow Farm, of the Effects of the Complex from Example 3

The objective of this study was to test the dietary supplement from Example 3 in vivo on a batch of dairy cows for 60 days to evaluate its effect on milk production, milk quality (BC, PC and Cells) and the urea level in the milk.

1) Materials and Method:

3 batches of dairy cows (DCs):
  7 animals per homogeneous batches (n=21).
  In stalls, without grazing and identical milking conditions (by robot).

Feed:
  Basic ration: 10 kg/DC/d of a mixture of barley (20%), soybean cake 48 (5%), maize (50%) and wheat bran (25%); alfalfa hay ad libitum.

Treatments:
  Control: basic ration described above.

Test 1 (iso-supplies)=basic ration from which soybean has been removed (500 g) and to which 145 g of the supplement from Example 3 and 500 g of maize have been added.

Test 2 (non-iso-supplies)=basic ration from which soybean has been removed and to which 145 g of the supplement from Example 3 has been added.

Results:

2.1) Milk Production Over a Period of 60 Days

Figure 11:
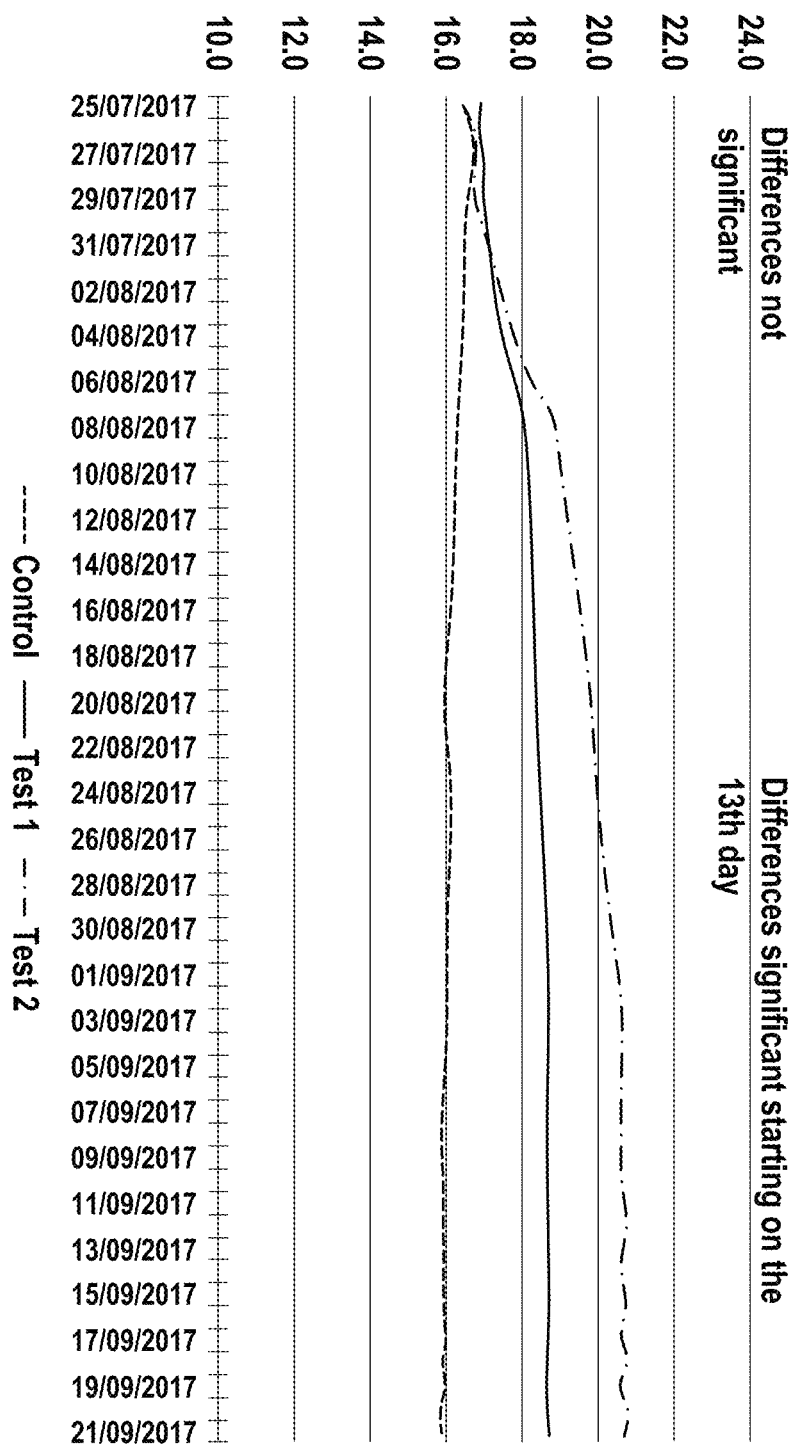
FIG. 11, FIG. 12 and FIG. 13 show the variation of milk production and of the quality criteria of the milk over time, namely the butterfat content (BC) and the protein content (PC) in a feed where the ration was supplemented with the complex from Example 3.

The results for milk production are presented in FIG. 11.

A significant improvement in milk production performance is observed starting from the 13th day. The results obtained for a mixed breed (*Baltata romaneasca*) therefore show a large gain in milk production of up to 4 L of milk/day at the end of a period of monitoring of two months.

2.2) Milk Quality

Figure 12:
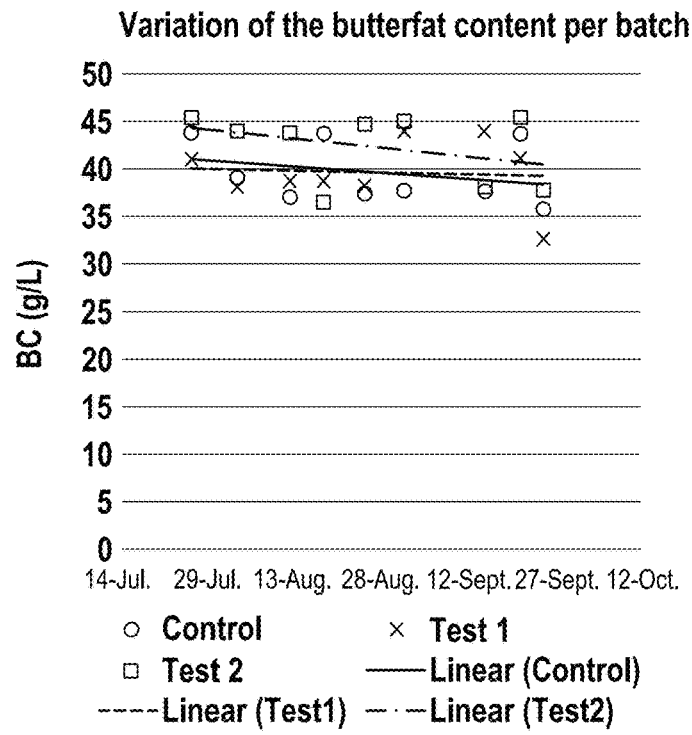
Figure 13:
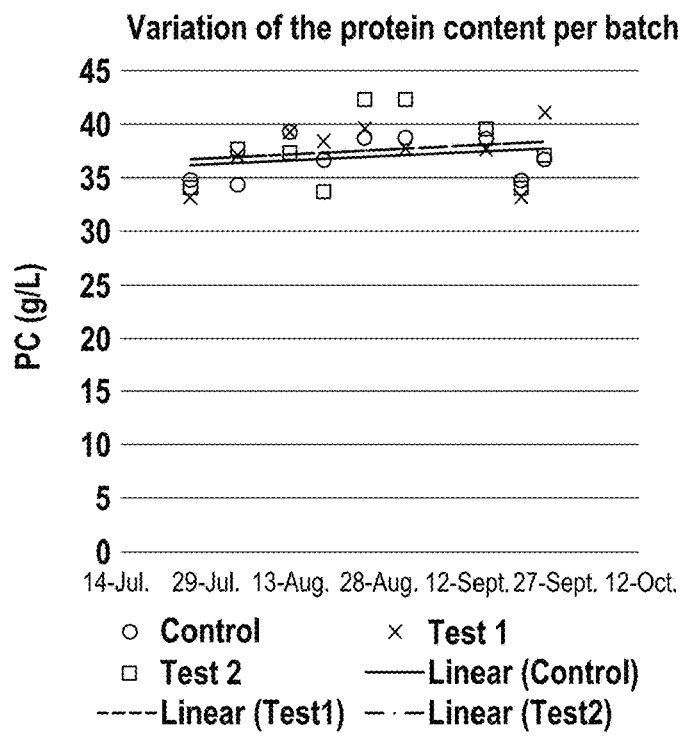

The results are presented in FIGS. 12 and 13.

Supply of the complex from Example 3 without iso supply (Test 2) tends to increase the BC in the milk. No difference is observed for the PC. The large increase in milk production did not lead to dilution of these levels. The cows have therefore produced more milk but also more fat and protein matter to maintain the level of BC and PC.

Comparative Example 14: Mixture of Urea and Mineral Powders According to the Prior Art The objective of this study was to compare the supplement from Example 7 and a mixture of urea with the same mineral powders in the same proportions, but on which the urea is not absorbed, in order to evaluate their effect on milk production at a dairy cow farm.

1) Materials and Method 2 batches of 7 cows of Prim'Holstein breed

Test duration: 2 months

Substitution for the batch Example 7
  Feed removed: 750 g of soybean cake
  Feed added: 250 g Example 7

Substitution for the batch Powder Base+Urea
  Feed removed: 750 g of soybean cake
  Feed added: 150 g urea+100 g mineral base (same proportion as Example 7)

2) Results for Milk Production

Figure 14:
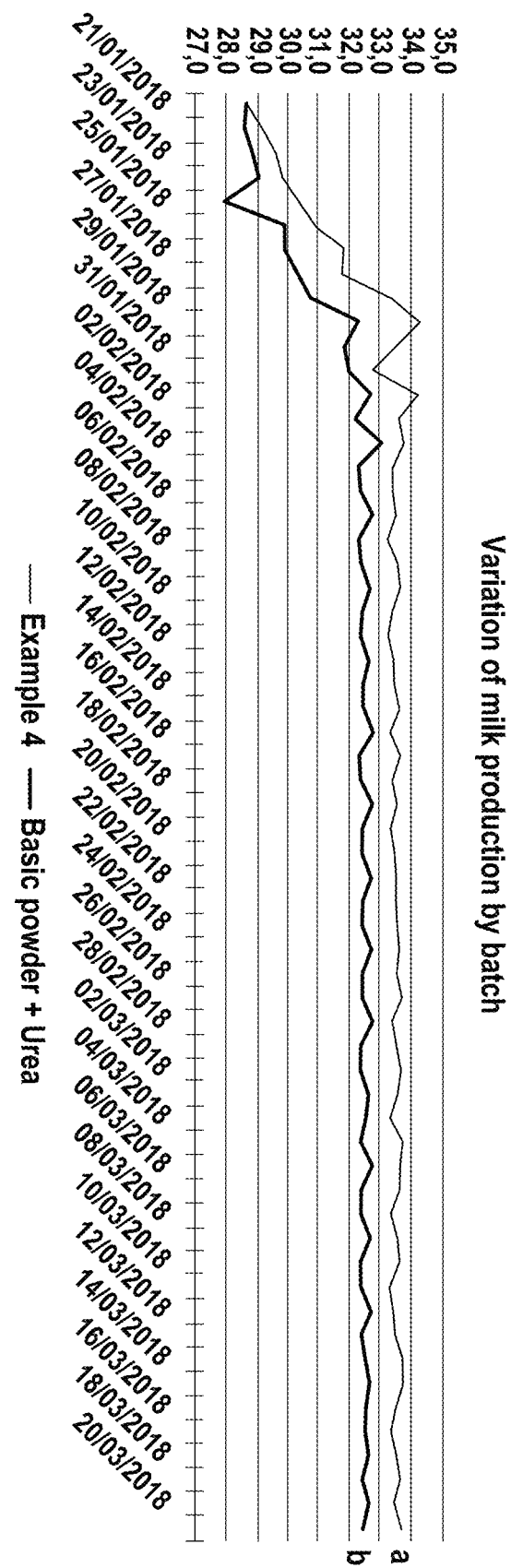
FIG. 14 shows the variation of milk production over time in a feed supplemented either with the complex from Example 7, or with a mixture of urea and mineral powders identical to that in Example 7 and used in the same proportions, the urea not being adsorbed on the mineral particles in this mixture.

The results are presented in FIG. 14.

A significant effect ($p<0.05$) of Example 7 is observed relative to the simple mixture of the powder base+urea on the animals' milk production. After 60 days, an increase in daily production equal to 1.2 L of milk is obtained with example 7 relative to the Powder Base+Urea.

The invention claimed is:

1. A method of feeding a ruminant, comprising feeding the ruminant with a dietary supplement for ruminants, the dietary supplement for ruminants comprising urea and mineral particles, said mineral particles comprising a mixture of particles of at least one fibrous clay and particles of at least one nonfibrous clay, wherein the urea is adsorbed on the particles of the at least one fibrous clay and on the particles of the at least one nonfibrous clay so that urea, fibrous clay particles and nonfibrous clay particles form an organic-inorganic complex.

2. The method as claimed in claim 1, wherein the weight ratio of urea to the mineral particles is between 30/70 and 80/20.

3. The method as claimed in claim 1, wherein fibrous clay particles represent between 10 wt % and 65 wt % of the weight of the mineral particles.

4. The method as claimed in claim 1, wherein the fibrous clay is an attapulgite.

5. The method as claimed in claim 4, wherein the attapulgite has an oversize retained on a 75 micron sieve of less than 20% when measured by a dry sieving method.

6. The method as claimed in claim 1, wherein the nonfibrous clay particles represent from 5 wt % to 60 wt % of the weight of the mineral particles.

7. The method as claimed in claim 1, wherein the nonfibrous clay has a cation exchange capacity (CEC) from 2 cmol/kg to 150 cmol/kg, and a specific surface area from 10 $m^2/g$ to 700 $m^2/g$.

8. The method as claimed in claim 1, wherein the nonfibrous clay is a bentonite.

9. The method as claimed in claim 1, wherein the mineral particles comprise at least one zeolite.

10. The method as claimed in claim 9, wherein the zeolite particles represent between 0 wt % and 60 wt % of the weight of the mineral particles.

11. The method as claimed in claim 9, wherein particles having a size from 5 microns to 125 microns represent from 75 wt % to 95 wt % or from 85 wt % to 95 wt % of the weight of the zeolite particles.

12. The method as claimed in claim 1, further comprising at least one other ingredient selected from the group consisting of vitamins, minerals, byproducts of distillation of cereals with or without solubles (DDG and DDGS), solubles of concentrated cereals (CDS), prebiotic fibers, probiotics, amino acids, proteins, omega-3 fatty acids, lignans, digestive enzymes, essential oil of *Thymus vulgaris*, chestnut extracts, leonardite, peat, chestnut tannins, flax seeds, polyphenols, saponins, microalgae, macroalgae, and algae extracts.

13. The method of feeding a ruminant as claimed in claim 1 further comprising feeding the ruminant with a daily ration comprising hay, maize silage, grass silage, cereals, oilseed cakes and a soluble nitrogen source.

14. The method as claimed in claim 1, wherein the mineral particles consist essentially of a mixture of the particles of at least one fibrous clay and the particles of at least one nonfibrous clay.

15. The method as claimed in claim 1, wherein the mineral particles consist essentially of a mixture made of the particles of at least one fibrous clay, the particles of at least one nonfibrous clay, and particles of at least one zeolite.

16. The method of feeding a ruminant as claimed in claim 1, where feeding the ruminant results in improving a zootechnical performance selected from the group consisting of a daily weight gain, an increase in milk production and a combination thereof.

* * * * *